United States Patent
Natarajan et al.

(10) Patent No.: US 10,862,849 B2
(45) Date of Patent: Dec. 8, 2020

(54) ADDRESS RESOLUTION SYSTEM

(71) Applicant: Dell Products L.P., Round Rock, TX (US)

(72) Inventors: Avinash Natarajan, Tamil Nadu (IN); Sudharsan Dhamal Gopalarathnam, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 16/258,461

(22) Filed: Jan. 25, 2019

(65) Prior Publication Data

US 2020/0244617 A1 Jul. 30, 2020

(51) Int. Cl.
*H04L 29/12* (2006.01)
*H04L 29/06* (2006.01)
*H04L 12/749* (2013.01)
*H04L 12/745* (2013.01)

(52) U.S. Cl.
CPC .......... *H04L 61/103* (2013.01); *H04L 45/741* (2013.01); *H04L 45/748* (2013.01); *H04L 61/6022* (2013.01); *H04L 69/167* (2013.01)

(58) Field of Classification Search
CPC . H04L 61/103; H04L 45/741; H04L 61/6022; H04L 45/748; H04L 69/167
See application file for complete search history.

(56) References Cited

U.S. PATENT DOCUMENTS

| | | | |
|---|---|---|---|
| 2002/0138628 A1* | 9/2002 | Tingley | H04L 61/10 709/227 |
| 2013/0077529 A1* | 3/2013 | Lueckenhoff | H04L 41/12 370/255 |
| 2016/0105314 A1* | 4/2016 | Logue | G06F 16/38 726/4 |
| 2016/0173450 A1* | 6/2016 | Mircescu | H04L 63/1416 726/14 |
| 2016/0359801 A1* | 12/2016 | Tonzetic | H04L 61/103 |
| 2017/0310635 A1* | 10/2017 | Yang | H04L 67/10 |
| 2020/0159603 A1* | 5/2020 | Panda | H04L 69/329 |

* cited by examiner

*Primary Examiner* — Nicholas R Taylor
*Assistant Examiner* — Sanjoy Roy
(74) *Attorney, Agent, or Firm* — Haynes and Boone, LLP

(57) ABSTRACT

An address resolution system a host device, a first networking device, and a second networking device that is coupled to the host device and the first networking device. The second networking device is configured to send a first address resolution communication to the first networking device. The second networking device may then receive a second address resolution communication from the first networking device in response to the first address resolution communication. The second address resolution communication includes networking device identification data that identifies the first networking device as having a networking type. The second networking device may then allocate, in an address resolution database in response to the networking device identification data identifying the first networking device as having the networking type, a first address resolution entry for the first networking device that includes an egress object.

20 Claims, 8 Drawing Sheets

ADDRESS RESOLUTION SYSTEM

BACKGROUND

The present disclosure relates generally to information handling systems, and more particularly to providing address resolution for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, networking devices (e.g., switch devices), perform address resolution operations in order to discover device link layer (layer 2) addresses associated with respective device network layer (layer 3) addresses. For example, in the Internet Protocol version 4 (IPv4), networking devices receiving an IPv4 layer 3 address for a device may utilize the Address Resolution Protocol (ARP) to determine a Media Access Control (MAC) layer 2 address for that device. Similarly, in the Internet Protocol version 6 (IPv6), networking devices receiving an IPv6 layer 3 address for a device may utilize the Neighbor Discovery Protocol (NDP) to determine a MAC layer 2 address for that device.

In IPv4, a switch device may include a look-up table that is configured to store IPv4 address/MAC address associations, and when that switch device receives data traffic addressed to an IPv4 address (e.g., 192.168.1.1) that is not associated with a MAC address, it may broadcast an ARP request data packet to the devices in its network (e.g., via a Local Area Network (LAN) using a particular MAC address that causes all devices in that network to receive that ARP request data packet), and when the device that is associated with that IPv4 address receives the ARP request, it will reply to the switch device with an ARP response data packet that includes its MAC address for receiving data packets. The switch device will then associate that MAC address with the IPv4 address in its look-up table so it may use that MAC address when that IPv4 address is received in the future. In IPv6, IPv6 address/MAC address associations may be made in a substantially similar manner but with NDP neighbor solicitation data packets replacing the ARP request data packets discussed above, and NDP neighbor advertisement data packets replacing the ARP response data packets discussed above. The resolution of address via the methods discussed above raises some issues.

For example, with some networking device chipsets (e.g., chipsets manufactured by BROADCOM® Inc. of San Jose, Calif., United States), address resolution entries (e.g., the IPv4 address/MAC address and/or IPv6 address/MAC address associations in the look-up table discussed above) may be programmed in two ways: as a normal host entry with an egress object, or as an extended host entry without an egress object. As would understood by one of skill in the art, the egress object provided with a normal host entry includes data packet transmission information such as, for example, a destination MAC address, a Virtual Local Area Network (ULAN) identifier, a port identifier, and/or other data transmission information that may be used in transmitting a data packet, while an extended host entry provides such data transmission information in an extended view of the look-up table itself. Furthermore, other tables in networking devices (e.g., Longest Prefix Match (LPM) tables, route tables, etc.) may link to the egress objects included in normal host entries in order to route data packets through the network, but are unable to providing similar linking to extended host entries due to their lack of an egress object (and the inability to access the data transmission information provided with extended host entries in the extended view of the look-up table.)

Further still, address resolution entries may be provided for host devices that provide for the termination of routes in the network, or intermediate networking devices that may provide a hop for multiple routes through the network. As would be understood by one of skill in the art, when normal host entries are used to provide the address resolution entries for intermediate networking devices, the egress object in those normal host entries may be linked to by many other routes in tables provided in the networking device to in order to provide their data packet routes through the network, while when those normal host entries are used to provide the address resolution entries for host devices, most devices in the network will not link to the egress object in those normal host entries due to the host device providing for the termination of routes in the network (and thus not providing a hop for routes through the network.) However, normal host entries available in look-up tables are limited, and conventional address resolution communications (e.g., the ARP requests and responses and/or the Neighbor solicitations and advertisements discussed above) do not provide the ability to indicate whether a device for which an address resolution entry is being created is a host device or an intermediate router device. Conventional address resolution systems simply operate to first utilize each of the normal host entries available in look-up tables, followed by the use of the extended host entries in look-up tables. As such, in many cases, the limited number of normal host entries with egress objects ma be used for host devices, and can result in extended host entries being provided for intermediate networking devices, which as discussed above prevents routing entries in tables in the networking device from linking to the address resolution entries for those intermediate networking devices (i.e., due to their lack of an egress object.)

The unavailability of normal host entries and their egress object for intermediate networking device address resolution entries can result in route failures, and solutions to these issues include performing extensive reprogramming of the look-up tables to change the entry types of existing look-up table address resolution entries (i.e., from normal host entries to extended host entries) in order to free up normal host entries/egress objects for use by intermediate networking devices, which can result in data packet traffic disruptions with established host devices.

Accordingly, it would be desirable to provide an improved address resolution system.

SUMMARY

According to one embodiment, an Information Handling System (IHS) includes a processing system; and a memory system that is coupled to the processing system and that includes instructions that, when executed by the processing system, cause the processing system to provide an address resolution engine that is configured to: send a first address resolution communication to a first networking device; receive, in response to the first address resolution communication, a second address resolution communication from the first networking device, wherein the second address resolution communication includes networking device identification data that identifies the first networking device as having a networking type; and allocate, in an address resolution database in response to the networking device identification data identifying the first networking device as having the networking type, a first address resolution entry for the first networking device that includes an egress object.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
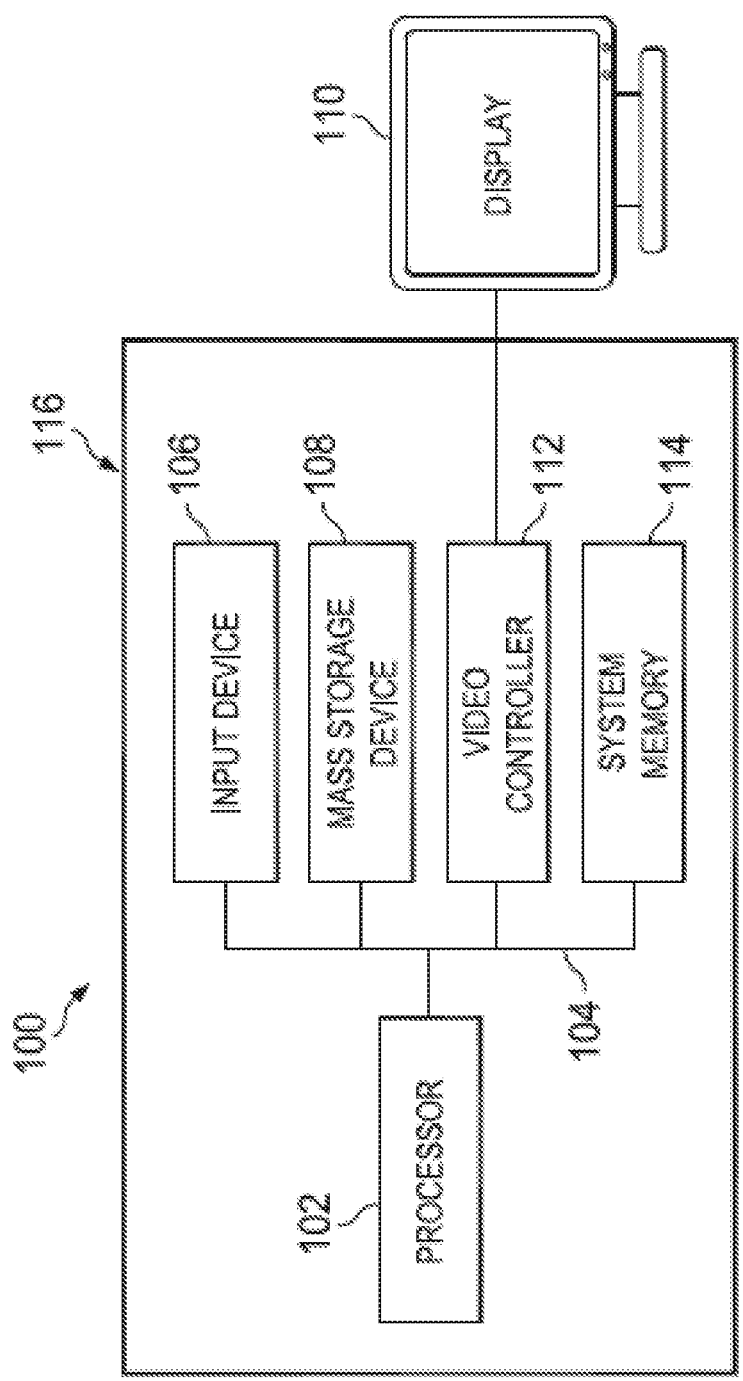
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
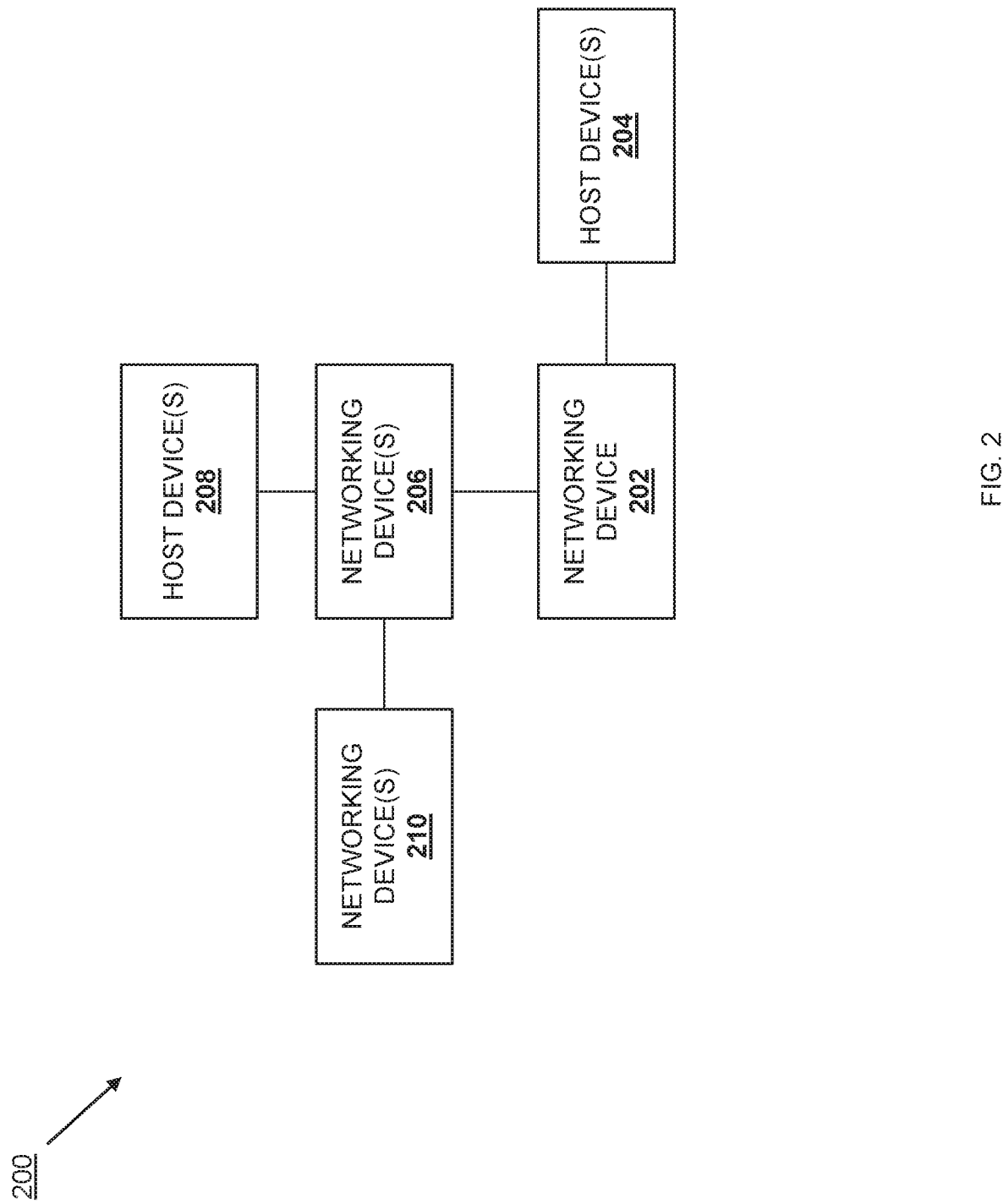
FIG. 2 is a schematic view illustrating an embodiment of an address resolution system of the present disclosure.

Referring now to FIG. 2, an embodiment of an address resolution system 200 is illustrated. In the illustrated embodiment, the address resolution system 200 includes a networking device 202. The networking device 202 may be provided by the IHS 100 discussed above, and/or may include some or all of the components of the IHS. In a specific example, the networking device 202 may be provided by a switch device, although other networking devices that perform address resolution will benefit from the teachings of the present disclosure and thus will fall within its scope as well. The networking device 202 is illustrated as directly coupled to one or more host devices 204. Any or all of the host device(s) 204 may be provided by the IHS 100 discussed above, and/or may include some or all of the components of the IHS 100. In a specific example, the host device(s) 204 may be provided by any computing device in a datacenter that provides for the termination of data packet routes included in the network provided in that datacenter. However, one of skill in the art in possession of the present disclosure will recognize that host devices may be provided by other types of computing devices while remaining within the scope of the present disclosure as well. The networking device 206 is also illustrated as coupled to one or more networking devices 206. Any or all of the networking device(s) 206 may be provided by the IHS 100 discussed above, and/or may include some or all of the components of the IHS 100. In a specific example, the networking device(s) 206 may be provided by intermediate router device(s) in a datacenter that provide a hop for a plurality of data packet routes through the network provided in that datacenter. However, one of skill in the art in possession of the present disclosure will recognize that networking devices may be provided by other types of computing devices while remaining within the scope of the present disclosure as well.

As illustrated in FIG. 2, any of the networking device(s) 206 may be directly coupled to respective host device(s)

208, which may be similar to the host device(s) 204 discussed above, and thus may be provide by the IHS 100 of FIG. 1, include some or all of the components of the IHS, and in specific embodiments may be provided by any computing device in a datacenter that provides for the termination of data packet routes included in the network provided in that datacenter. As also illustrated in FIG. 2, any of the networking device(s) 206 may be coupled to networking device(s) 210, which may be similar to the networking device(s) 206 discussed above, and thus may be provide by the IHS 100 of FIG. 1, include some or all of the components of the IHS, and in specific embodiments may be provided by intermediate router device(s) in the datacenter that provide a hop for a plurality of data packet routes through the network provided in that datacenter. Furthermore, the networking device(s) 210 may be coupled to host device(s) and/or networking device(s) similarly as described above for the networking device(s) 202 and 206, and so on. However, while a specific address resolution system 200 has been described, one of skill in the art in possession of the present disclosure will recognize that datacenters and/or other networks may provide the address resolution system of the present disclosure while including a variety of devices and/or device configurations while remaining within the scope of the present disclosure as well.

Figure 3:
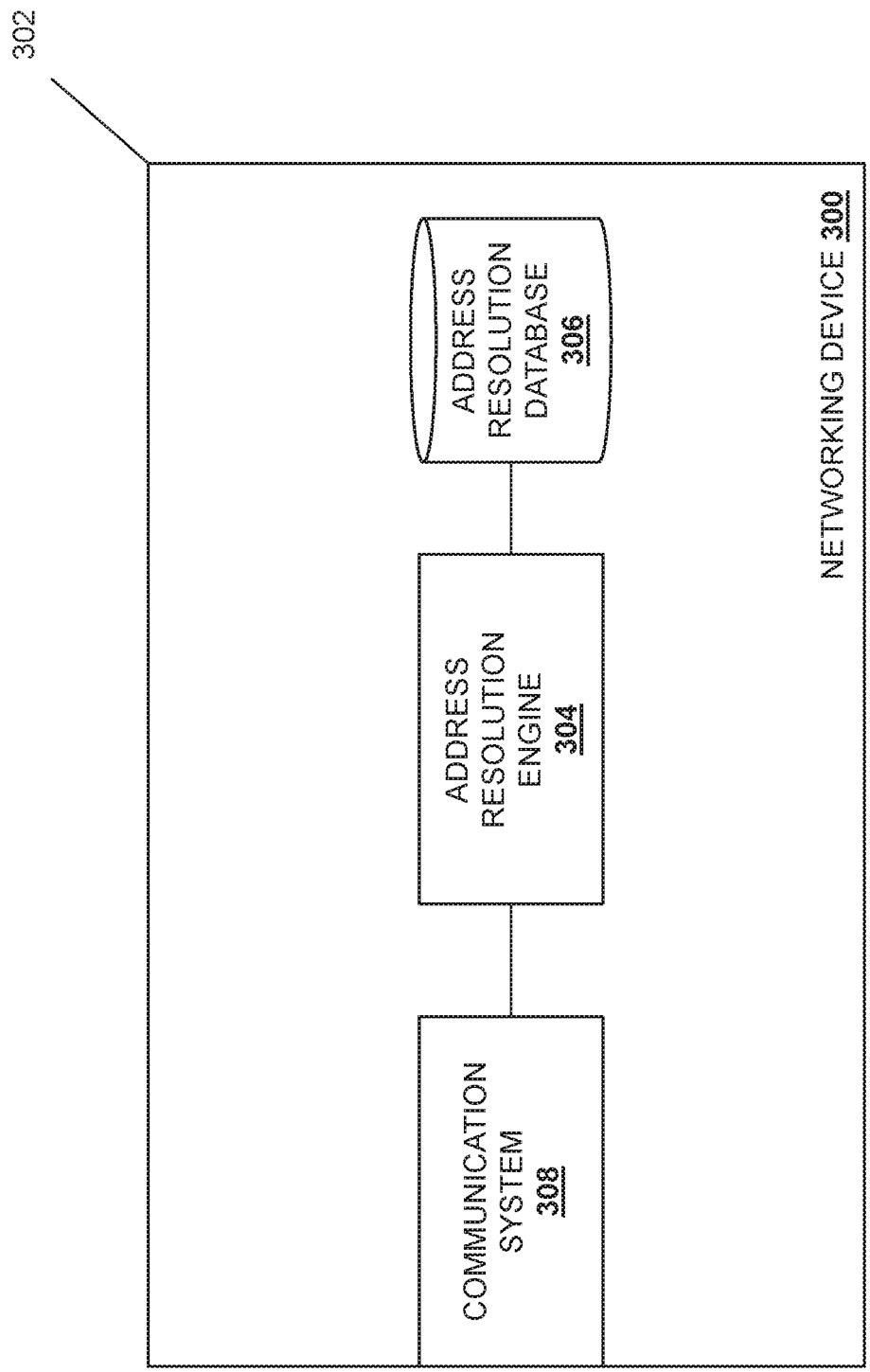
FIG. 3 is a schematic view illustrating an embodiment of a networking device that may be provided in the address resolution system of FIG. 2.

Referring now to FIG. 3, an embodiment of a networking device 300 is illustrated that may provide any or all of the networking devices 202, 206, and 210 discussed above with reference to FIG. 2. As such, the networking device 300 may be provided by the IHS 100 discussed above with reference to FIG. 1 and/or may include some or all of the component of the IHS 100, and in specific examples may be provided by an intermediate router device in a datacenter that provides a hop for a plurality of data packet routes through the network provided in that datacenter. In the illustrated embodiment, the networking device 300 includes a chassis 302 that houses the components of the networking device 300, only some of which are illustrated in FIG. 3. For example, the chassis 302 may house a processing system (not illustrated, but which may include the processor 102 discussed above with reference to FIG. 1) that is coupled to a memory system (not illustrated, but which may include the memory 114 discussed above with reference to FIG. 1) that includes instructions that, when executed by the processing system, cause the processing system to provide an address resolution engine 304 that is configured to perform the functionality of the address resolution engines in the networking devices discussed below.

The chassis 302 may also house a storage system (not illustrated, but which may include the storage device 108 discussed above with reference to FIG. 1) that is coupled to the address resolution engine 304 (e.g., via a coupling between the processing system and the storage system) and that includes an address resolution database 306 that is configured to store any of the information utilized by the address resolution engine 304 discussed below. The chassis 302 may also house a communication system 308 that is coupled to the address resolution engine 304 (e.g., via a coupling between the processing system and the communication system 308) and that may include a Network Interface Controller (NIC), a wireless communication subsystem (e.g., a BLUETOOTH® communication subsystem, a Near Field Communication (NFC) subsystem, a WiFi communication subsystem, and/or other wireless components known in the art), and/or any other communication system components that would be apparent to one of skill in the art in possession of the present disclosure. While a specific networking device 300 has been illustrated and described below, one of skill in the art in possession of the present disclosure will recognize that networking devices may include a variety of components and/or component configuration for performing conventional networking device functionality, as well as the functionality discussed below, while remaining within the scope of the present disclosure.

Figure 4:
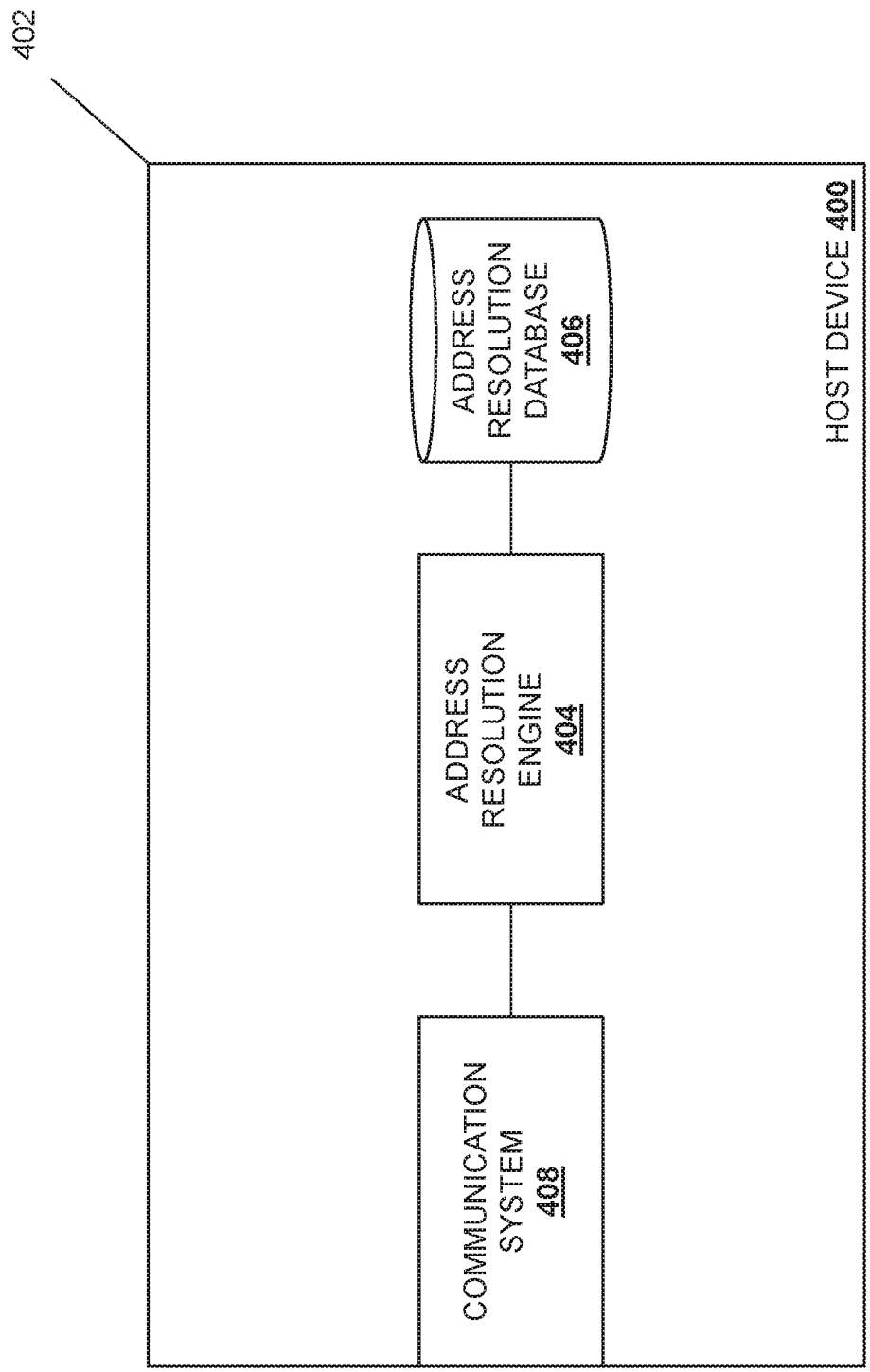
FIG. 4 is a schematic view illustrating an embodiment of a host device that may be provided in the address resolution system of FIG. 3.

Referring now to FIG. 4, an embodiment of a host device 400 is illustrated that may provide any or all of the host devices 204 and 208 discussed above with reference to FIG. 2, As such, the host device 400 may be provided by the IHS 100 discussed above with reference to FIG. 1 and/or may include some or all of the component of the IHS 100, and in specific examples may be provided by any computing device in a datacenter that provides for the termination of data packet routes included in the network provided in that datacenter. In the illustrated embodiment, the host device 400 includes a chassis 402 that houses the components of the host device 400, only some of which are illustrated in FIG. 4. For example, the chassis 402 may house a processing system (not illustrated, but which may include the processor 102 discussed above with reference to FIG. 1) that is coupled to a memory system (not illustrated, but which may include the memory 114 discussed above with reference to FIG. 1) that includes instructions that, when executed by the processing system, cause the processing system to provide an address resolution engine 404 that is configured to perform the functionality of the address resolution engines in the host devices discussed below.

The chassis 402 may also house a storage system (not illustrated, but which may include the storage device 108 discussed above with reference to FIG. 1) that is coupled to the address resolution engine 404 (e.g., via a coupling between the processing system and the storage system) and that includes an address resolution database 406 that is configured to store any of the information utilized by the address resolution engine 404 discussed below. The chassis 402 may also house a communication system 408 that is coupled to the address resolution engine 404 (e.g., via a coupling between the processing system and the communication system 408) and that may include a Network Interface Controller (NIC), a wireless communication subsystem (e.g., a BLUETOOTH® communication subsystem, a Near Field Communication (NFC) subsystem, a WiFi communication subsystem, and/or other wireless components known in the art), and/or any other communication system components that would be apparent to one of skill in the art in possession of the present disclosure. While a specific host device 400 has been illustrated and described below, one of skill in the art in possession of the present disclosure will recognize that host devices may include a variety of components and/or component configuration for performing conventional host device functionality, as well as the functionality discussed below, while remaining within the scope of the present disclosure.

Figure 5:
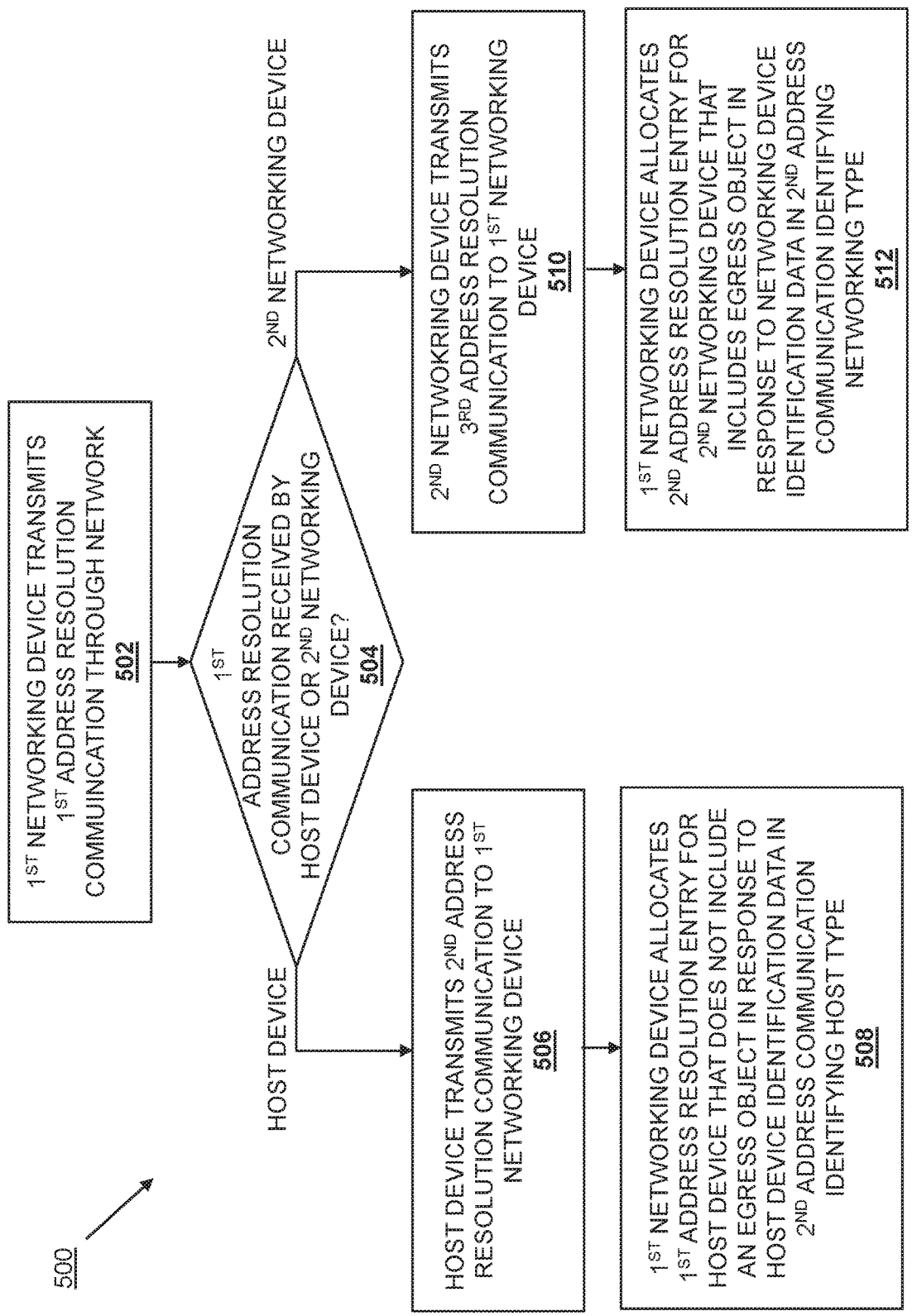
FIG. 5 is a flow chart illustrating an embodiment of a method for providing address resolution.

Referring now to FIG. 5, an embodiment of a method 500 for providing address resolution is illustrated. As discussed below, the systems and methods of the present disclosure provide for the provisioning of a device type in an address resolution communication, which allows a networking device that requested that address resolution communication to identify the device type and allocate an address resolution entry that may include an egress object (or not) based on that device type. For example, for devices in a network communicating via IPv4, a first networking device may broadcast an ARP request to the network, and host devices may provide ARP responses that include host device identification data in a padding section of the ARP response that indicates they have a host type, while second networking devices may provide ARP responses that include networking device identification data in the padding section of the ARP response that indicates they have a networking type. The first networking device receiving the ARP responses will allocate ARP entries without egress objects to the host devices having the host type, while allocating ARP entries with egress objects to the second networking devices having the networking type.

Similarly, for devices in a network communicating via IPv6, a first networking device may transmit neighbor solicitations to the network, and host devices may provide neighbor advertisements that include host device identification data in a reserved section of the neighbor advertisements that indicates they have a host type, while second networking devices may provide neighbor advertisements that include networking device identification data in the reserved section of the neighbor advertisements that indicates they have a networking type. The first networking device receiving the neighbor advertisements will allocate address resolution entries without egress objects to the host devices having the host type, while allocating address resolution entries with egress objects to the second networking devices having the networking type. As such, ARP; address resolution entries with egress objects may be allocated to networking devices such as intermediate router devices such that those egress objects may be linked to by other route entries in tables included in the networking device in order to provide their data packet routes through the network, while ARP/address resolution entries without egress objects may be allocated to host devices that provide for the termination of routes in the network (and thus do not provide a hop for other routes through the network.) Thus, limited ARP/address resolution entries with egress objects may be utilized more efficiently than in conventional address resolution systems, reducing route failures and/or the need to perform extensive reprogramming of look-up tables to change the address resolution entry types of existing look-up table address resolution entries in order to free up ARP/address resolution entries with egress objects for use by intermediate networking devices.

The method 500 begins at block 502 where first networking device transmits a first address resolution communication through a network. In the examples discussed below, the networking device 202 in the address resolution system 200 operates to perform the "first networking device" functionality of the method 500, while the networking device(s) 206 operate to perform the "second networking device" functionality of the method 500, and the host device(s) 204 operate to provide the "host device" functionality of the method 500. However, one of skill in the art will recognize that any of the networking devices 202, 206 and/or 210 may perform either or both of the "first networking device" functionality and the "second networking device" functionality discussed below, and any of the host devices 204 and 208 may perform the "host device" functionality discussed below while remaining within the scope of the present disclosure. In some embodiments, at or before block 502, the address resolution engine 304 in the networking device 202/300 may receive (e.g., via its communication system 308) an IP address, and may attempt to perform address resolution operations in order to discover a MAC address of a device that uses that IP address. As discussed above, the address resolution engine 304 in the networking device 202/300 may access a look-up table in its address resolution database 306 to determine whether address resolution operations were previously performed for that IP address such that the MAC address associated with the device that utilizes that IP address was stored in the address resolution database 306. In the event no MAC address associated with that IP address is found in the address resolution database 306, the address resolution engine 304 may operate to perform block 502 of the method 500.

Figure 6:
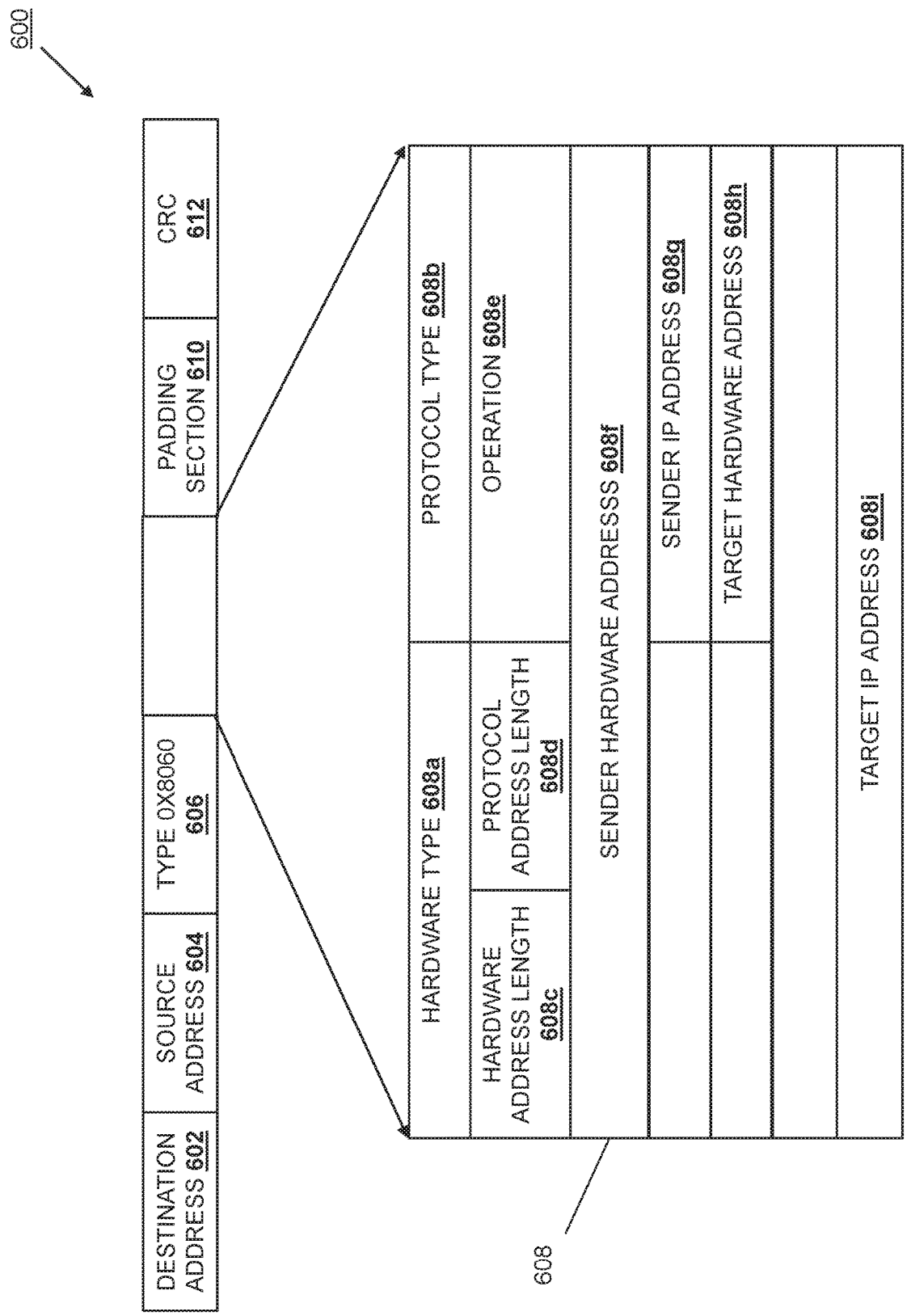
FIG. 6 is a schematic view illustrating an embodiment of an address resolution data packet used in IPv4.

In some embodiments of the method 500, the networking device 202/300 is configured to utilize IPv4, and at block 502 the address resolution engine 304 in the networking device 202/300 operates to generate an ARP request that provides the first address resolution communication. With reference to FIG. 6, an embodiment of an ARP request/response data packet 600 is illustrated. In the illustrated embodiment, the ARP request/response data packet 600 includes a destination address 602, a source address 604, a type (0x8060) 606, an ARP payload 608 section 608, a padding section 610, and a Cyclic Redundancy Check (CRC) 612. Furthermore, in the illustrated embodiment, the ARP payload 608 includes a plurality of sections that include a hardware type section 608a, a protocol type section 608b, a hardware address length section 608c, a protocol address length section 608d, an operation section 608e, a sender hardware address section 608f, a sender Internet Protocol (IP) address section 608g, a target hardware address section 608h, and a target IP address section 608i.

While not discussed in detail herein, one of skill in the in possession of the present disclosure will recognize how the address resolution engine 304 in the networking device 202/300 may include information in the ARP request data packet 600 in order to provide an ARP request that is configured to request a MAC address associated with a device that utilizes the IPv4 address received as discussed above. Furthermore, as would be understood by one of skill in the art in possession of the present disclosure, the data size of the ARP payload 608 is 28 bytes, and when added to the data sizes of the destination address 602, the source address 604, the type (0x0806) 606, and the CRC 612, a total of 46 bytes of data are required to provide the data in the ARP request/response data packet 600. However, valid Ethernet frames are required to be at least 64 bytes, so the padding section 610 is provided with 18 bytes of data that are not utilized in conventional ARP operations performed to provide for address resolution.

As discussed below, some embodiments of the address resolution system of the present disclosure utilize the padding section 610 to identify a device type of the device sending the ARP request/response data packet 600. For example, at block 502, the address resolution engine 304 in the networking device 202/300 may operate to generate an ARP request data packet that may be substantially similar to the ARP request/response data packet 600 of FIG. 6, and may include information for retrieving a device type of a device that responds to that ARP request data packet. For example, in some embodiments, the address resolution engine 304 in the networking device 202/300 may provide a device type request (e.g., a value of "0x1") in the padding section 610, which may be configured to notify a receiving device that the networking device 202 is requesting device type information. In some embodiments, the address resolution engine 304 in the networking device 202/300 may provide networking device identification data (e.g., a value of "0x2") in the padding section 610 that, as discussed below, is configured to identify that the networking device 202/300 has a networking type such as, for example, an intermediate router device type. In a specific example, at block 502, the address resolution engine 304 in the networking device 202/300 may operate to generate the ARP request data packet, and may provide the device type request and/or the networking device identification data in the padding section 610 preceded by (e.g., at the beginning of the padding section 610) a data start indicator that is configured to indicate that the device type request and/or networking device identification data is included in the padding section 610. As discussed below, the networking device 202/300 may provide the networking device identification data in the ARP request data packets that are used to perform address resolution so that devices receiving those ARP request data packets can "learn" that the networking device 202/300 is networking type device from those ARP request data packets. Subsequent to generating the ARP request data packet, the address resolution engine 304 in the networking device 202/300 may broadcast the ARP request data packet to the network so that it may be received by the host device(s) and networking device(s) as discussed below.

Furthermore, the hardware type section 608a in the ARP payload 608 is configured to provide information about the underlying hardware upon which the IP protocol is being provided, and the Internet Engineering Task Force (IETF) Request For Comments (RFC) 1060 defines a variety of hardware types that may be included in the hardware type section 608a (e.g., an Ethernet (10 Mb) hardware type via a value "1", an Experimental Ethernet (3 Mb) hardware type via a value "2", an Amateur Radio AX.25 hardware type via a value "3", a Proteon ProNET Token Ring hardware type via a value "4", a Chaos hardware type via a value "5", an IEEE 802 Networks hardware type via a value "5", an ARCNET hardware type via a value "6", a Hyperchannel hardware type via a value "7", a Lanstar hardware type via a value "8", an Autonet Short Address hardware type via a value "9", a LocalTalk hardware type via a value "10", and a LocalNet (IBM PCNET or SYTEK LocalNet) hardware type via a value "12"). However, as will be understood by one of skill in the art in possession of the present disclosure, the hardware type section 608a was introduced in the early stages of the Internet when these multiple hardware type technologies were available and Ethernet was in its nascent stage, and in the current datacenter environment, Ethernet is used. As such, the value "1" to provide the Ethernet (10 Mb) hardware type is almost always used in the hardware type section 608a and the other values are seldom, if ever, used.

As discussed below, some embodiments of the address resolution system of the present disclosure utilize the hardware type section 608a to identify a device type of the device sending the ARP request/response data packet 600. For example, at block 502, the address resolution engine 304 in the networking device 202/300 may operate to generate an ARP request data packet that may be substantially similar to the ARP request/response data packet 600 of FIG. 6, and may provide a device type request (e.g., a value of "1000") to notify a receiving device that the networking device 202 is requesting device type information, and/or a networking device identification data (e.g., a value of "1001") in the hardware type section 608a that, as discussed below, is configured to identify that the networking device 202/300 has a networking type such as, for example, an intermediate router device type. As discussed below, the networking device 202/300 may provide the device type request and/or the networking device identification data in the ARP request data packets that are used to perform address resolution so that devices receiving those ARP request data packets can "learn" that the networking device 202/300 is networking type device from those ARP request data packets. Subsequent to generating the ARP request data packet, the address resolution engine 304 in the networking device 202/300 may broadcast the ARP request data packet to the network so that it may be received by the host device(s) and networking device(s) as discussed below.

In some embodiments of the method 500, the networking device 202/300 is configured to utilize IPv6, and at block 502 the address resolution engine 304 in the networking device 202/300 operates to generate an NDP neighbor solicitation data packet that provides the first address resolution communication. With reference to FIG. 6, an embodiment of a neighbor solicitation data packet 700 is illustrated. In the illustrated embodiment, the neighbor solicitation data packet 700 includes a type section 702, a code section 704, a checksum section 706, a reserved section 708, a target address section 710, and an options section 712. While not discussed in detail herein, one of skill in the in possession of the present disclosure will recognize how the address resolution engine 304 in the networking device 202/300 may include information in the neighbor solicitation data packet 700 in order to provide an neighbor solicitation that is configured to request a MAC address of a device that utilizes the IPv6 address received as discussed above. As would be understood by one of skill in the art in possession of the present disclosure, the reserved section 708 is unused in conventional address resolution operations performed via conventional neighbor solicitation data packets.

Figure 7:
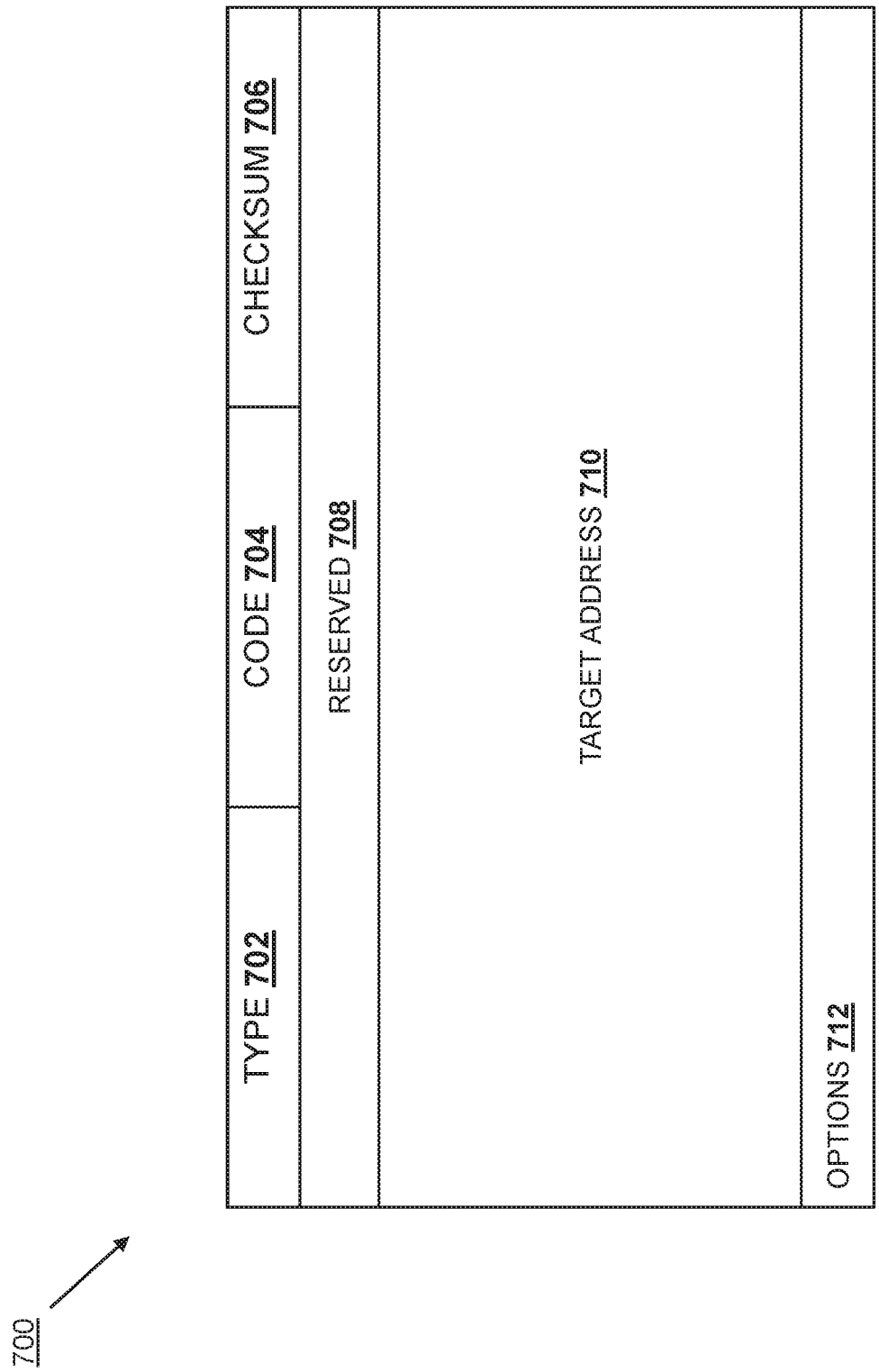
FIG. 7 is a schematic view illustrating an embodiment of an address resolution data packet used in IPv6.

As discussed below, some embodiments of the address resolution system of the present disclosure utilize the reserved section 708 to identify a device type of the device sending the neighbor solicitation data packet 700. For example, at block 502, the address resolution engine 304 in the networking device 202/300 may operate to generate an neighbor solicitation data packet that may be substantially similar to the neighbor solicitation data packet 700 of FIG. 7, and may provide a device type request (e.g., a value of "1") in the reserved section 708 to notify a receiving device that the networking device 202 is requesting device type information, and/or networking device identification data (e.g., a value of "2") in the reserved section 708 that, as discussed below, is configured to identify that the networking device 202/300 has a networking type such as, for example, an intermediate router device type. As discussed below, the networking device 202/300 may provide the networking device identification data in the neighbor solicitation data packets that are used to perform address resolution so that devices receiving those neighbor solicitation data packets can "learn" that the networking device 202/300 is networking type device from those neighbor solicitation data packets. Subsequent to generating the neighbor solicitation data packet, the address resolution engine 304 in the networking device 202/300 may transmit the neighbor solicitation data packet through the network so that it may be received by the host device(s) and networking device(s) as discussed below.

The method 500 then proceeds to decision block 504 where the first address resolution communication is received by either a host device or a second networking device. As discussed above, at block 502, the networking device 202 may transmit first address resolution communications through the network (e.g., via the broadcast ARP request or the neighbor solicitations discussed above) and, at block 504, those first address resolution communications may be received by any or all of the host device(s) 204 and/or the networking device(s) 206. As discussed below, the second address resolution communication provided to the networking device 202 in response to the first address resolution will differ depending on whether it is provided by the host device(s) 204 or the networking device(s) 206.

If, at decision block 504, the first address resolution communication is received by a host device, the method 500 proceeds to block 506 where the host device transmits a second address resolution communication to the first networking device. In an embodiment, at block 506, the address resolution engine 404 in any of the host device(s) 204/400 may receive the first address communication via its communication system 408 and, in response to the first address communication identifying an IP address associated with that host device 204/400, the address resolution engine 404 may generate a second address resolution communication and transmit that second address resolution communication to the networking device 202/300.

In embodiments of the method 500 in which the host device 204/400 is configured to utilize IPv4, at decision block 504 the address resolution engine 404 in the host device 204/400 operates to receive (via its communication system 408) the ARP request that provides the first address resolution communication that was sent by the networking device 202 at block 502. With reference to the ARP request data packet 600 of FIG. 6, in some embodiments of block 506, the address resolution engine 404 in the host device 204/400 may access information that was included in the padding section 610 by the networking device 202 to request a device type of the host device 204 and/or identify a networking device type of the networking device 202 (e.g., an intermediate router device type.) In a specific example, at block 506, the address resolution engine 304 in the networking device 202/300 may operate to access the padding section 610 of the ARP request data packet 600 and identify (e.g., at the beginning of the padding section 610) a data start indicator that indicates to the address resolution engine 404 in the host device 204/400 that the device type request and/or networking device identification data is included in the padding section 610 and, in response, identify that device type request and that networking device identification data. In other embodiments of block 506, the address resolution engine 404 in the host device 204/400 may access information that was included in the hardware type section 608*a* by the networking device 202 to request a device type of the host device 204 and/or identify the networking device type of the networking device 202. In response to identifying the networking device identification data, the address resolution engine 404 in the host device 204/400 may store the networking device identification data in the address resolution database 406 in that host device 204/400. One of skill in the art in possession of the present disclosure will recognize that, in at least some embodiments, the host devices may not save information about the networking device types of networking devices, as those host device may not utilize that information.

In response to receiving the ARP request, at block 506 the address resolution engine 404 in the host device 204/400 may generate an ARP response that provides the second address resolution communication. In some examples, the address resolution engine 404 in the host device 204/400 may generate an ARP response data packet that may be substantially similar to the ARP request/response data packet 600 of FIG. 6, and may provide host device identification data (e.g., a value of "0x3") in the padding section 610 that, as discussed below, is configured to identify that the host device 204/400 has a host type such as, for example, for a host device that provides for the termination of routes in the network. In a specific example, at block 502, the address resolution engine 404 in the host device 204/400 may operate to generate the ARP response data packet, and may provide host device identification data in the padding section 610 preceded by (e.g., at the beginning of the padding section 610) a data start indicator that is configured to indicate that the host device identification data is included in the padding section 610. In other examples, the address resolution engine 404 in the host device 204/400 may generate an ARP response data packet that may be substantially similar to the ARP request/response data packet 600 of FIG. 6, and may provide host device identification data (e.g., a value of "1002") in the hardware type section 608*a* that, as discussed below, is configured to identify that the host device 204 has a host type such as, for example, for a host device that provides for the termination of routes in the network. Subsequent to generating the ARP response data packet, the address resolution engine 404 in the host device 204/400 may transmit the ARP response data packet via its communication system 408 to the networking device 202.

In embodiments of the method 500 in which the host device 204/400 is configured to utilize IPv6, at decision block 504 the address resolution engine 404 in the host device 204/400 operates to receive (via its communication system 408) the neighbor solicitation that provides the first address resolution communication that was sent by the networking device 202 at block 502. With reference to the neighbor solicitation data packet 700 of FIG. 7, in some embodiments of block 506, the address resolution engine 404 in the host device 204/400 may access information that was included in the reserved section 708 by the networking device 202 to request a device type of the host device 204 and/or identify a networking device type of the networking device 202 (e.g., an intermediate router device type.) In response to identifying the networking device identification data, the address resolution engine 404 in the host device 204/400 may store the networking device identification data in the address resolution database 406 in that host device 204/400.

Figure 8:
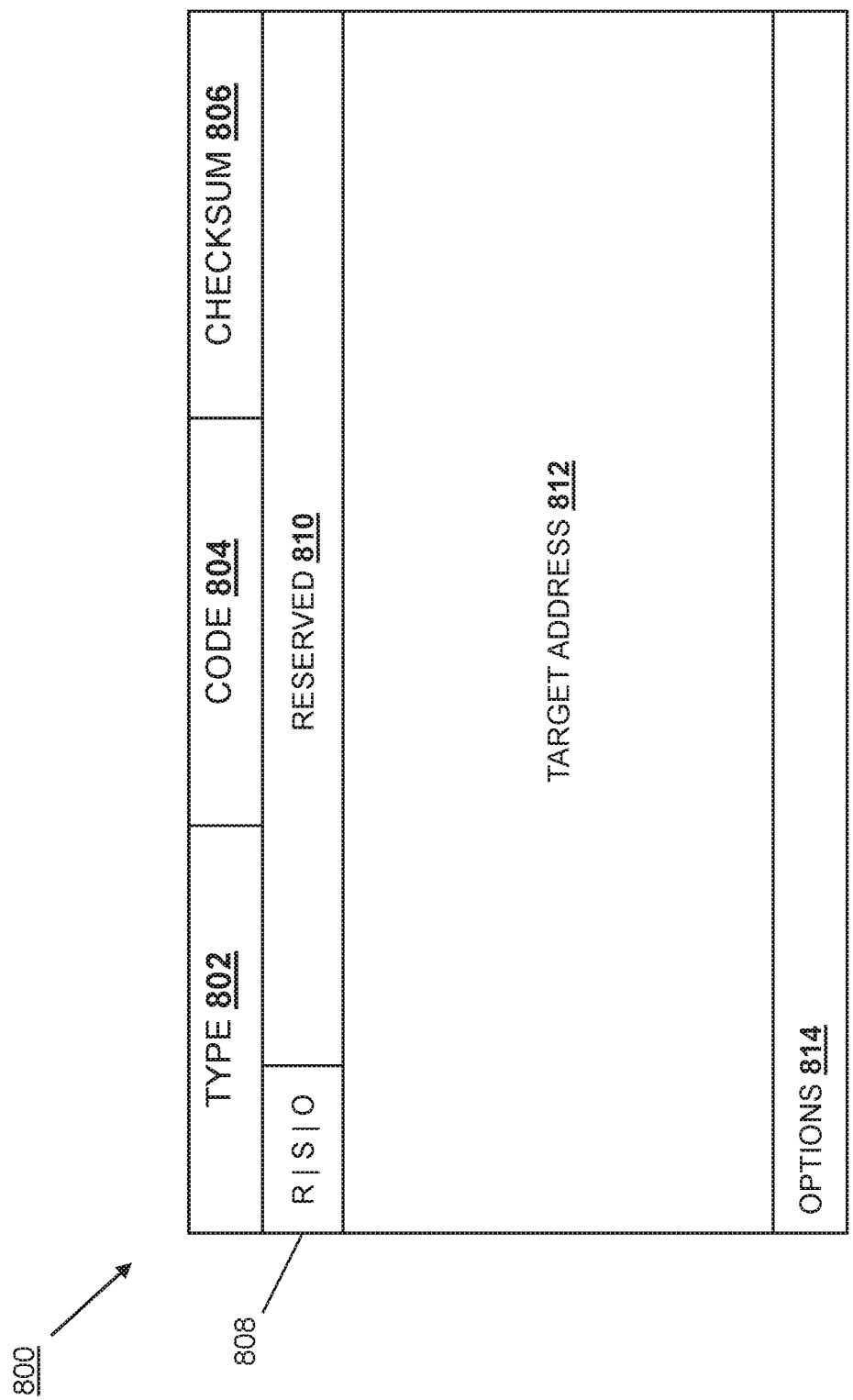
FIG. 8 is a schematic view illustrating an embodiment of an address resolution data packet used in IPv6.

In response to receiving the neighbor solicitation, at block 506 the address resolution engine 404 in the host device 204/400 may generate a neighbor advertisement that provides the second address resolution communication. With reference to FIG. 8, an example of a neighbor advertisement data packet 800 is illustrated. In the illustrated embodiment, the neighbor advertisement data packet 800 includes a type section 802, a code section 804, a checksum section 806, an R SIO section 808, a reserved section 810, a target address section 812, and an options section 814. While not discussed in detail herein, one of skill in the in possession of the present disclosure will recognize how the address resolution engine 404 in the host device 204/400 may include information in the neighbor advertisement data packet 800 in order to provide a neighbor advertisement that is configured to identify a MAC address that is used by the device associated with the IPv6 address received as discussed above. As would be understood by one of skill in the art in possession of the present disclosure, the reserved section 810 is unused in conventional address resolution operations performed via conventional neighbor advertisement data packets.

As discussed below, some embodiments of the address resolution system of the present disclosure utilize the reserved section 810 to identify a device type of the device sending the neighbor advertisement data packet 800. For example, at block 508, the address resolution engine 404 in the host device 202/300 may operate to generate an neighbor advertisement data packet that may be substantially similar to the neighbor advertisement data packet 800 of FIG. 8, and may provide host device identification data in the reserved section 810 that, as discussed below, is configured to identify that the host device 204 has a host type such as, for example, for a host device that provides for the termination of routes in the network. Subsequent to generating the neighbor advertisement data packet, the address resolution engine 404 in the host device 204/400 may transmit the neighbor advertisement data packet via its communication system 408 and through the network so that it may be received by the networking device 202.

The method 500 then proceeds to block 508 where the first networking device allocates a first address resolution entry for the host device that does not include an egress object in response to host device identification data in the second address resolution communication that identifies a host type. In an embodiment, at block 508, the address resolution engine 304 in the networking device 202/300 may receive the second address resolution communication sent by the host device 204 via its communication system 308. In response to receiving the second address resolution communication, the address resolution engine 304 in the networking device 202/300 may identify the host type of the host device 204 that sent that second address resolution communication and, in response, allocate a first address resolution entry that does not include an egress object in its address resolution database 406 (e.g., a look-up table in the first networking device 202).

In embodiments of the method 500 in which the networking device 202 is configured to utilize IPv4, at block 508 the address resolution engine 304 in the networking device 202/300 operates to receive (via its communication system 308) the ARP response that provides the second address resolution communication that was sent by the host device 204 at block 506. With reference to the ARP request data packet 600 of FIG. 6, in some embodiments of block 508, the address resolution engine 304 in the networking device 202/300 may access information that was included in the padding section 610 by the host device 204 to identify a host type of the host device 204 (e.g., a host type for host devices that provide for the termination of routes in the network.) In a specific example, at block 508, the address resolution engine 304 in the networking device 202/300 may operate to access the padding section 610 of the ARP response data packet 600 and identify (e.g., at the beginning of the padding section 610) a data start indicator that indicates to the address resolution engine 304 in the networking device 202/300 that the host device identification data is included in the padding section 610 and, in response, identify that host device identification data. In other embodiments of block 508, the address resolution engine 304 in the networking device 202/300 may access information that was included in the hardware type section 608a by the host device 204 to identify the host type of the host device 204. In response to identifying the host device identification data, the address resolution engine 304 in the networking device 202/300 may allocate a first address resolution entry that does not include an egress object for the host device 204 in its address resolution database 306.

In embodiments of the method 500 in which the networking device 202 is configured to utilize IPv6, at decision block 508 the address resolution engine 304 in the networking device 202/300 operates to receive (via its communication system 308) the neighbor advertisement that provides the second address resolution communication that was sent by the host device 204 at block 506. With reference to the neighbor advertisement data packet 800 of FIG. 8, in some embodiments of block 508, the address resolution engine 304 in the networking device 202/300 may access information that was included in the reserved section 810 by the host device 204 to identify a host device type of the host device 204 (e.g., a host type for host devices that provide for the termination of routes in the network.) In response to identifying the host device identification data, the address resolution engine 304 in the networking device 202/300 may allocate a first address resolution entry that does not include an egress object for the host device 204 in its address resolution database 306.

If, at decision block 504, the first address resolution communication is received by a second networking device, the method 500 proceeds to block 510 where the second networking device transmits a third address resolution communication to the first networking device. In an embodiment, at block 510, the address resolution engine 304 in any of the networking device(s) 206/300 may receive the first address communication via its communication system 308 and, in response to the first address communication identifying an IP address associated with that networking device 206/300, the address resolution engine 304 may generate a third address resolution communication and transmit that third address resolution communication to the networking device 202/300.

In embodiments of the method 500 in which the networking device 206/300 is configured to utilize IPv4, at decision block 504 the address resolution engine 304 in the networking device 206/300 operates to receive (via its communication system 408) the ARP request that provides the first address resolution communication that was sent by the networking device 202 at block 502. With reference to the ARP request data packet 600 of FIG. 6, in some embodiments of block 506, the address resolution engine 304 in the networking device 206/300 may access information that was included in the padding section 610 by the networking device 202 to request a device type of the networking device 206 and/or identify a networking device type of the networking device 202 (e.g., an intermediate router device type.) In a specific example, at block 506, the address resolution engine 304 in the networking device 206/300 may operate to access the padding section 610 of the ARP request data packet 600 and identify (e.g., at the beginning of the padding section 610) a data start indicator that indicates to the address resolution engine 304 in the networking device 206/300 that the device type request and/or networking device identification data is included in the padding section 610 and, in response, identify that networking device identification data. In other embodiments of block 506, the address resolution engine 304 in the networking device 206/300 may access information that was included in the hardware type section 608a by the networking device 202 to request the device type of the networking device 206 and/or identify the networking device type of the networking device 202. In response to identifying the networking device identification data, the address resolution engine 304 in the networking device 206/300 may store the networking device identification data in the address resolution database 306 in that networking device 206/300, As such, the networking device 206/300 may create address resolution entries with egress objects for the networking device 202 (e.g., the ARP request may have originated from a networking device and may include information for the networking device type identification, which allows a networking device receiving the ARP request to create host table entries with egress objects.)

In response to receiving the ARP request, at block 506 the address resolution engine 304 in the networking device 206/300 may generate an ARP response that provides the third address resolution communication. In some examples, the address resolution engine 304 in the networking device 206/300 may generate an ARP response data packet that may be substantially similar to the ARP request/response data packet 600 of FIG. 6, and may provide networking device identification data in the padding section 610 that, as discussed below, is configured to identify that the networking device 206/300 has a networking type such as, for example, an intermediate router device type. In a specific example, at block 502, the address resolution engine 304 in the networking device 206/300 may operate to generate the ARP response data packet, and may provide networking device identification data in the padding section 610 preceded by (e.g., at the beginning of the padding section 610) a data start indicator that is configured to indicate that the networking device identification data is included in the padding section 610. In other examples, the address resolution engine 304 in the networking device 206/300 may generate an ARP response data packet that may be substantially similar to the ARP request/response data packet 600 of FIG. 6, and may provide networking device identification data in the hardware type section 608a that, as discussed below, is configured to identify that the networking device 206/300 has a networking type such as, for example, an intermediate networking device type. Subsequent to generating the ARP response data packet, the address resolution engine 304 in the networking device 206/300 may transmit the ARP response data packet to the networking device 202 via its communication system 408.

In embodiments of the method 500 in which the networking device 206/300 is configured to utilize IPv6, at decision block 504 the address resolution engine 304 in the networking device 206/300 operates to receive the neighbor solicitation that provides the first address resolution communication that was sent by the networking device 202 at block 502 via its communication system 408. With reference to the neighbor solicitation data packet 700 of FIG. 7, in some embodiments of block 506, the address resolution engine 304 in the networking device 206/300 may access information that was included in the reserved section 708 by the networking device 202 to identify a networking device type of the networking device 202 (e.g., an intermediate router device type.). In response to identifying the networking device identification data, the address resolution engine 304 in the networking device 206/300 may store the networking device identification data in the address resolution database 306 in that networking device 206/300.

In response to receiving the neighbor solicitation, at block 506 the address resolution engine 304 in the networking device 206/300 may generate a neighbor advertisement that provides the third address resolution communication. One of skill in the in possession of the present disclosure will recognize how the address resolution engine 304 in the networking device 206/300 may include information in the neighbor advertisement data packet 800 of FIG. 8 in order to provide a neighbor advertisement that is configured to identify a MAC address utilized by the device with the IPv6 address received as discussed above. As discussed below, some embodiments of the address resolution system of the present disclosure utilize the reserved section 810 to identify a device type of the device sending the neighbor advertisement data packet 800. At block 508, the address resolution engine 304 in the networking device 206/300 may operate to generate an neighbor advertisement data packet that may be substantially similar to the neighbor advertisement data packet 800 of FIG. 8, and may provide networking device identification data in the reserved section 810 that, as discussed below, is configured to identify that the networking device 206/300 has a networking type such as, for example, an intermediate router device type. Subsequent to generating the neighbor advertisement data packet, the address resolution engine 304 in the networking device 206/300 may transmit the neighbor advertisement data packet through the network so that it may be received by the networking device 202.

The method 500 then proceeds to block 512 where the first networking device allocates a second address resolution entry that includes an egress object for the second networking device in response to networking device identification data in the second address resolution communication that identifies a networking type. In an embodiment, at block 512, the address resolution engine 304 in the networking device 202/300 may receive (via its communication system 308) the third address resolution communication sent by the networking device 206. In response to receiving the third address resolution communication, the address resolution engine 304 in the networking device 202/300 may identify the networking type of the networking device 206 that sent that third address resolution communication and, in response, allocate a second address resolution entry that includes an egress object in its address resolution database 306 (e.g., a look-up table for the networking device 202) for the networking device 206.

In embodiments of the method 500 in which the networking device 202 is configured to utilize IPv4, at block 512 the address resolution engine 304 in the networking device 202/300 operates to receive (via its communication system 308) in the ARP response that provides the third address resolution communication that was sent by the networking device 206 at block 510. With reference to the ARP request data packet 600 of FIG. 6, in some embodiments of block 508, the address resolution engine 304 in the networking device 202/300 may access information that was included in the padding section 610 by the networking device 206 to identify a networking type of the networking device 206 (e.g., an intermediate router device type.) In a specific example, at block 512, the address resolution engine 304 in the networking device 202/300 may operate to access the padding section 610 of the ARP response data packet 600 and identify (e.g., at the beginning of the padding section 610) a data start indicator that indicates to the address resolution engine 304 in the networking device 202/300 that the networking device identification data is included in the padding section 610 and, in response, identify that networking device identification data. In other embodiments of block 508, the address resolution engine 304 in the networking device 202/300 may access information that was included in the hardware type section 608a by the networking device 206 to identify the networking type of the networking device 206. In response to identifying the networking device identification data, the address resolution engine 304 in the networking device 202/300 may allocate a second address resolution entry that includes an egress object in its address resolution database 306 (e.g., a look-up table for the networking device 202) for the networking device 206.

In embodiments of the method 500 in which the networking device 202/300 is configured to utilize IPv6, at block 512 the address resolution engine 304 in the networking device 202/300 operates to receive (via its communication system 308) the neighbor advertisement that provides the third address resolution communication that was sent by the networking device 206 at block 510. With reference to the neighbor advertisement data packet 800 of FIG. 8, in some embodiments of block 512, the address resolution engine 304 in the networking device 202/300 may access information that was included in the reserved section 810 by the networking device 206 to identify a networking device type of the networking device 206 (e.g., an intermediate router device type.) In response to identifying the networking device identification data, the address resolution engine 304 in the networking device 202/300 may allocate a second address resolution entry that includes an egress object in its address resolution database 306 (e.g., a look-up table for the networking device 202) for the networking device 206.

As would be understood by one of skill in the art, the allocation of address resolution entries without egress objects (e.g., "extended host entries") to host devices that may provide for the termination of routes in the network operates to save the limited address resolution entries with egress objects (e.g., "normal host entries") for networking devices/intermediate router devices that provide hops for multiple routes through the network. As such, the address resolution entries that include egress objects, which may be linked to by many other route entries in tables in the networking device in order to provide their data packet routes through the network, are saved for the networking devices that are configured to provide those data packet routes, rather than simply allocated to the first device that responds to address resolution communications. Thus, address resolution entries with egress objects are not allocated to host devices where they are not useful for linking to by other devices in the network (as those host devices cannot provide a hop for routes through the network), and address resolution entries without egress objects are not provided for networking devices unless all the address resolution entries with egress objects have been used up.

Thus, systems and methods have been described that provide for the provisioning of a device type in an address resolution communication in order to allow a networking device that requested that address resolution communication to identify the device type and allocate an address resolution entry with or without an egress object based on that device type. A first networking device broadcasts an address resolution request to the network, and host devices may provide address resolution responses that include host device identification data in a conventionally unused section of the address resolution response that indicates they have a host device type, while second networking devices may provide address resolution responses that include networking device identification data in a conventionally unused section of the address resolution response that indicates they have a networking device type. The first networking device receiving the address resolution responses will allocate address resolution entries without egress objects to the host devices having the host device type, while allocating address resolution entries with egress objects to the second networking devices having the networking device type. As such, address resolution entries with egress objects are allocated to networking devices such as intermediate router devices such that those egress objects may be linked to by route entries in tables in the networking device in order to provide their data packet routes through the network, while address resolution entries without egress objects are allocated to host devices that provide for the termination of routes in the network (and thus do not provide a hop for other routes through the network.) Thus, limited address resolution entries with egress objects are utilized more efficiently than in conventional address resolution systems, reducing route failures and/or the need to perform extensive reprogramming of look-up tables to change the address resolution entry types of existing look-up table address resolution entries in order to free up address resolution entries with egress objects for use by intermediate networking devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An address resolution system, comprising:
a host device;
a first networking device; and
a second networking device that is coupled to the host device and the first networking device, wherein the second networking device is configured to:
send a first address resolution communication to the first networking device, wherein the first address resolution communication includes a first device type request that is configured to notify the first networking device that the second networking device is requesting device type information;
receive, in response to the first address resolution communication, a second address resolution communication from the first networking device, wherein the second address resolution communication includes networking device identification data that responds to the first device type request and that includes device type information that identifies the first networking device as having a networking type; and
allocate, in an address resolution database in response to the networking device identification data identifying the first networking device as having the networking type, a first address resolution entry for the first networking device that includes an egress object.

2. The system of claim 1, wherein the second networking device is configured to:
send a third address resolution communication to the host device, wherein the third address resolution communication includes a second device type request that is configured to notify the host device that the second networking device is requesting device type information;
receive, in response to the third address resolution communication, a fourth address resolution communication from the host device, wherein the fourth address resolution communication includes host device identification data that responds to the second device type request and that includes device type information that identifies the host device as having a host type; and
allocate, in the address resolution database in response to the host device identification data identifying the host device as having the host type, a second address resolution entry for the host device that does not include an egress object.

3. The system of claim 1, wherein the second address resolution communication includes an Address Resolution Protocol (ARP) response data packet, and wherein the second networking device is configured to:
identify the networking device identification data included in a padding section of the ARP response data packet.

4. The system of claim 3, wherein the second networking device is configured to:
   identify a data start indicator in the beginning of the padding section of the ARP response data, wherein the data start indicator indicates that the networking device identification data is included in a padding section of the ARP response data packet; and
   identify, in response to identifying the data start indicator, the networking device identification data that follows the data start indicator in the padding section of the ARP response data packet.

5. The system of claim 1, wherein the second address resolution communication includes a Neighbor Discovery Protocol (NDP) neighbor advertisement data packet, and wherein the second networking device is configured to:
   identify the networking device identification data included in a reserved section of the NDP neighbor advertisement data packet.

6. The system of claim 1, wherein the second address resolution communication includes an Address Resolution Protocol (ARP) response data packet, and wherein the second networking device is configured to:
   identify the networking device identification data included in a hardware type section of the ARP response data packet.

7. An Information Handling System (IHS), comprising:
   a processing system; and
   a memory system that is coupled to the processing system and that includes instructions that, when executed by the processing system, cause the processing system to provide an address resolution engine that is configured to:
      send a first address resolution communication to a first networking device, wherein the first address resolution communication includes a first device type request that is configured to notify the first networking device that the address resolution engine is requesting device type information;
      receive, in response to the first address resolution communication, a second address resolution communication from the first networking device, wherein the second address resolution communication includes networking device identification data that responds to the first device type request and that includes device type information that identifies the first networking device as having a networking type; and
      allocate, in an address resolution database in response to the networking device identification data identifying the first networking device as having the networking type, a first address resolution entry for the first networking device that includes an egress object.

8. The IHS of claim 7, wherein the address resolution engine is configured to:
   send a third address resolution communication to a host device, wherein the third address resolution communication includes a second device type request that is configured to notify a host device that the address resolution engine is requesting device type information;
   receive, in response to the third address resolution communication, a fourth address resolution communication from the host device, wherein the fourth address resolution communication includes host device identification data that responds to the second device type request and that includes device type information that identifies the host device as having a host type; and
   allocate, in the address resolution database in response to the host device identification data identifying the host device as having the host type, a second address resolution entry for the host device that does not include an egress object.

9. The IHS of claim 7, wherein the second address resolution communication includes an Address Resolution Protocol (ARP) response data packet, and wherein the address resolution engine is configured to:
   identify the networking device identification data included in a padding section of the ARP response data packet.

10. The IHS of claim 9, wherein the address resolution engine is configured to:
    identify a data start indicator in the beginning of the padding section of the ARP response data, wherein the data start indicator indicates that the networking device identification data is included in a padding section of the ARP response data packet; and
    identify, in response to identifying the data start indicator, the networking device identification data that follows the data start indicator in the padding section of the ARP response data packet.

11. The IHS of claim 7, wherein the second address resolution communication includes a Neighbor Discovery Protocol (NDP) neighbor advertisement data packet, and wherein the address resolution engine is configured to:
    identify the networking device identification data included in a reserved section of the NDP neighbor advertisement data packet.

12. The IHS of claim 7, wherein the first address resolution communication includes a Neighbor Discovery Protocol (NDP) neighbor solicitation data packet, and wherein the address resolution engine is configured to:
    provide a request for the networking device identification data in a reserved section of the NDP neighbor solicitation data packet.

13. The IHS of claim 7, wherein the second address resolution communication includes an Address Resolution Protocol (ARP) response data packet, and wherein the address resolution engine is configured to:
    identify the networking device identification data included in a hardware type section of the ARP response data packet.

14. A method for providing address resolution, comprising:
    sending, by a first networking device, a first address resolution communication to a second networking device, wherein the first address resolution communication includes a first device type request that is configured to notify the second networking device that the first networking device is requesting device type information;
    receiving, by the first networking device in response to the first address resolution communication, a second address resolution communication from the second networking device, wherein the second address resolution communication includes networking device identification data that responds to the first device type request and that includes device type information that identifies the second networking device as having a networking type; and
    allocating, by the first networking device in an address resolution database in response to the networking device identification data identifying the second networking device as having the networking type, a first address resolution entry for the second networking device that includes an egress object.

15. The method of claim 14, further comprising:

sending, by the first networking device, a third address resolution communication to a host device, wherein the first address resolution communication includes a second device type request that is configured to notify the host device that the first networking device is requesting device type information;

receiving, by the first networking device in response to the third address resolution communication, a fourth address resolution communication from the host device, wherein the fourth address resolution communication includes host device identification data that responds to the second device type request and that includes device type information that identifies the host device as having a host type; and allocating, by the first networking device in the address resolution database in response to the host device identification data identifying the host device as having the host type, a second address resolution entry for the host device that does not include an egress object.

16. The method of claim 14, wherein the second address resolution communication includes an Address Resolution Protocol (ARP) response data packet, and wherein the method further comprises:

identifying, by the first networking device, the networking device identification data included in a padding section of the ARP response data packet.

17. The method of claim 16, further comprising:

identifying, by the first networking device, a data start indicator in the beginning of the padding section of the ARP response data, wherein the data start indicator indicates that the networking device identification data is included in a padding section of the ARP response data packet; and identifying, by the first networking device in response to identifying the data start indicator, the networking device identification data that follows the data start indicator in the padding section of the ARP response data packet.

18. The method of claim 14, wherein the second address resolution communication includes a Neighbor Discovery Protocol (NDP) neighbor advertisement data packet, and wherein the method further comprises:

identifying, by the first networking device, the networking device identification data included in a reserved section of the NDP neighbor advertisement data packet.

19. The method of claim 18, wherein the first address resolution communication includes a Neighbor Discovery Protocol (NDP) neighbor solicitation data packet, and wherein the method further comprises:

providing, by the first networking device, a request for the networking device identification data in a reserved section of the NDP neighbor solicitation data packet.

20. The method of claim 14, wherein the second address resolution communication includes an Address Resolution Protocol (ARP) response data packet, and wherein the method further comprises:

identifying, by the first networking device, the networking device identification data included in a hardware type section of the ARP response data packet.

* * * * *